United States Patent [19]

Meier et al.

[11] Patent Number: 4,499,836
[45] Date of Patent: Feb. 19, 1985

[54] SEWING MACHINE HAVING AN ELECTRONIC CONTROL

[75] Inventors: Günter Meier; Willi Meier; Jürgen Hartwig, all of Karlsruhe-Durlach, Fed. Rep. of Germany

[73] Assignee: Dorina Nähmaschinen GmbH, Fed. Rep. of Germany

[21] Appl. No.: 533,007

[22] Filed: Sep. 16, 1983

[30] Foreign Application Priority Data

Sep. 22, 1982 [DE] Fed. Rep. of Germany ....... 3235121

[51] Int. Cl.³ .............................................. D05B 3/02
[52] U.S. Cl. .............................. 112/158 E; 112/121.11
[58] Field of Search .......... 112/158 E, 121.11, 121.12, 112/158 F; 318/567, 569

[56] References Cited

U.S. PATENT DOCUMENTS

| | | | |
|---|---|---|---|
| 4,122,786 | 10/1978 | Tanimoto et al. | 112/158 E |
| 4,142,473 | 3/1979 | Itoh | 112/158 E |
| 4,177,744 | 12/1979 | Wurst | 112/158 E |
| 4,280,424 | 7/1981 | Carbonato et al. | 112/158 E |
| 4,343,248 | 8/1982 | Hanyu et al. | 112/158 E |
| 4,368,680 | 1/1983 | Fujimura | 112/158 E |
| 4,388,883 | 6/1983 | Hirota et al. | 112/121.12 |
| 4,445,449 | 5/1984 | Kuzuya et al. | 112/158 E X |

Primary Examiner—Peter Nerbun
Attorney, Agent, or Firm—McGlew and Tuttle

[57] ABSTRACT

In an electrically controlled sewing machine equipped with means for varying the feed and the needle position for individual stitches and with a program storage for storing consecutive sewing programs, the display is made easily understandable and the display unit remains a compact structure by providing alphanumeric display elements in a sequence and means for switching the display unit into a first state, in which a basic setting of the pattern is indicated in symbols, and into a second state in which the patterns can be indicated in the sequential order of their storage.

9 Claims, 10 Drawing Figures

SEWING MACHINE HAVING AN ELECTRONIC CONTROL

FIELD AND BACKGROUND OF THE INVENTION

This invention relates in general to sewing machines and in particular to a new and useful sewing machine having an electronic control.

In a prior art machine of this kind, (U.S. Pat. No. 4,122,786) in every instance only a single symbol of a plurality of sewing symbols stored in a program storage is indicated in the display. This has the disadvantage that if the entire program is to be checked, the contents of the storage locations must be sequentially shifted through the single display element. Since always only a single sewing pattern is indicated in the display, a checking of the correct sequential arrangement of different patterns is very difficult.

SUMMARY OF THE INVENTION

The present invention is directed to a display making it possible to indicate a plurality of functions in a way easy to follow.

The invention comprises a sewing machine with an electronic fixed storage which contains a plurality of data of sewing patterns including a plurality of stitches or only a single stitch. The machine includes means for selecting one of the sewing patterns at a time which are contained in a fixed storage. Manual setting means for varying the stitch position and the feed for selected sewing patterns are provided. In addition, a microcomputer having a display unit which can be actuated by control means provides a program storage with a program entering key for consecutively storing in the program storage the specific reference data of respective selected single sewing patterns. The device is also provided for controlling the sewing machine parts responsible for the stitch formation in accordance with the data stored in the fixed storage and associated with the reference data. In accordance with the invention, the program display unit comprises a plurality of alphanumeric display elements arranged in a row and side by side. Switching means are provided for switching the display unit into a first operating state in which a base setting associated with the selected sewing pattern can be indicated by predetermined groups of one of the display elements and into a second operating state in which the sewing patterns stored in the program storage can be indicated by one of the display elements in a sequence in which they are stored.

The invention provides a compact display unit which facilitates both checking and the operation of the sewing machine in spite of its small dimension. The provided display elements are utilized optimally.

The selection means for switching the display unit into a first operating state are advantageously provided and the program entering key for switching it to the second operating state are connected to the microcomputer. Thus an automatic switching of the display during operation of the machine is obtained. Advantageously the manual setting means for varying the stitch position and the feed are associated with the predetermined groups of display elements located in close vicinity to the display element. This facilitates and simplifies the adjustment of the stitching position and the feed as well as the checking of the operation.

The number of the display elements is smaller than that of the storage locations provided in the working storage of the microcomputer and intended to be set in the display. The sequence of the display elements is connectable through the microcomputer to a sequential group of storage locations. Display elements can advantageously be switched to the respective next group of storage locations following the just displayed one. The arrangement ensures a satisfactory display of all of the symbols representing the contents of the storage locations.

Accordingly, it is an object of the invention to provide an improved sewing machine having an electronic fixed storage.

A further object of the invention is to provide a sewing machine which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
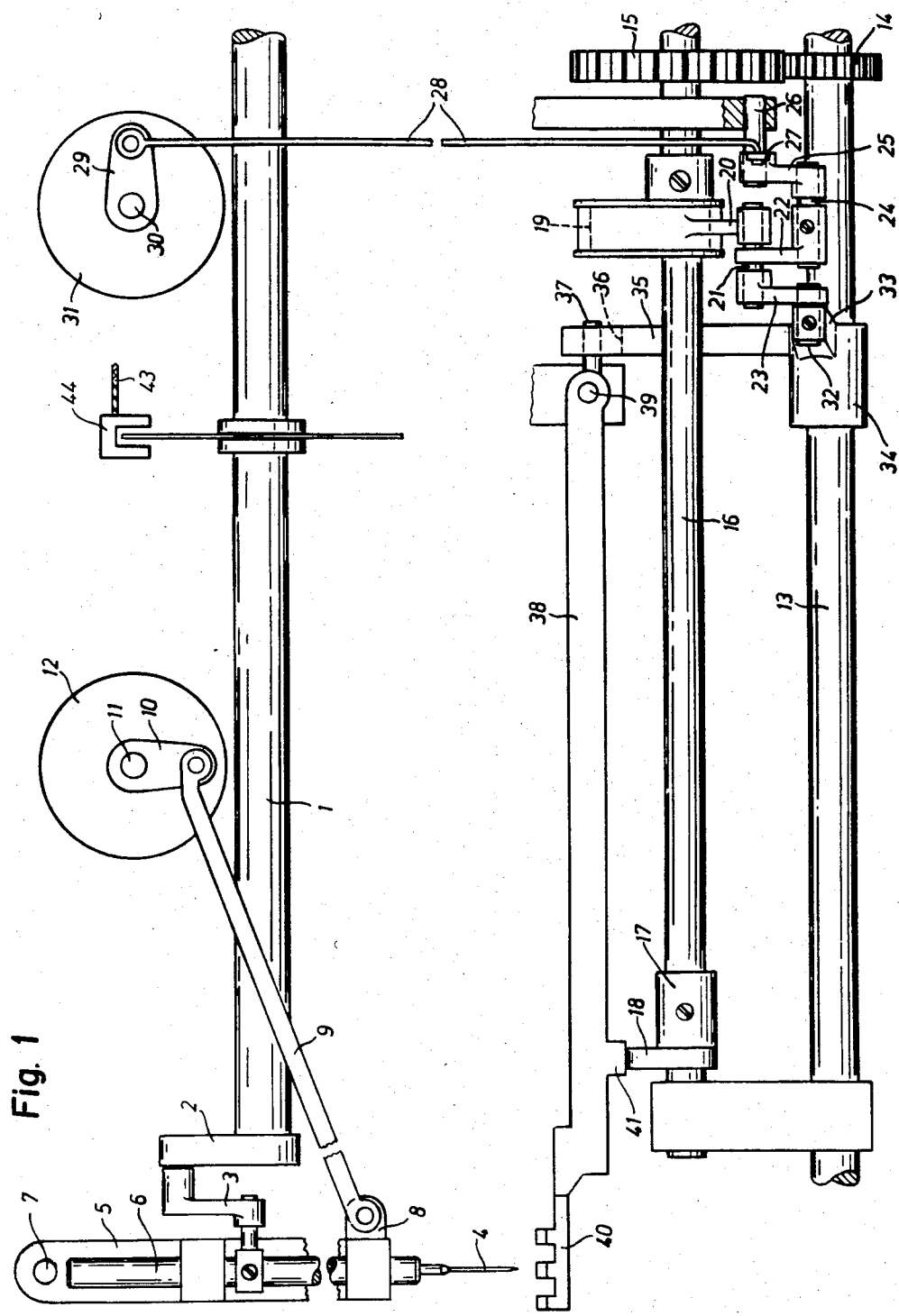
FIG. 1 is an elevational view showing a sewing machine with the control drives of the stitch positioning and the feed mechanisms.
Figure 2:
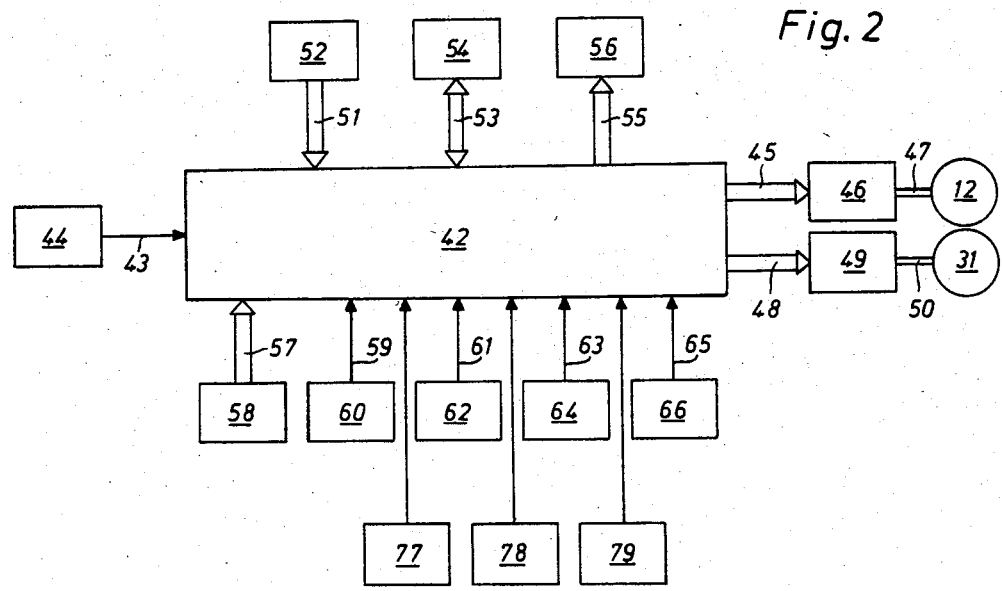
FIG. 2 is a block diagram of the control system of the sewing machine.

Referring to the drawings in particular the invention embodied therein comprises a sewing machine shown in FIG. 1 which comprises an electronic storage including a main computer 42 as shown in FIG. 2 with a display unit 56.

As shown in FIG. 1, the sewing machine comprises a main shaft 1 by which, through a crank 2 and a link 3, a needle bar 6 mounted on a swing arm 5 and carrying a needle 4 is moved upwardly and downwardly. Swing arm 5 is mounted by means of a pin 7 in the housing (not shown) of the sewing machine.

Swing arm 5 has an extension 8 hinged through a link 9 to a crank 10 which is secured to the shaft 11 of a stepping motor 12. Motor 12 is accommodated within the housing of the sewing machine and controls the stitching position of needle 4.

Main shaft 1 drives through a chain (not shown), a lower shaft 13. Shaft 13 carries a gear 14 meshing with another gear 15 which is secured to a shaft 16 extending parallel to shaft 13. Screwed to shaft 16 is a lifting eccentric 17 carrying a cam 18. Further secured to shaft 16 is an eccentric 19 which is embraced by an eccentric rod 20 to which two links 2, 23 are hinged by a bolt 21. Link 22 is hinged by means of a bolt 24 to a bell crank 25 which is mounted for rotation on a shaft 26 secured to a machine housing. Crank 25 has an arm 27 which is connected through a rod 28 to a crank 29 secured to the shaft 30 of another stepping motor 31 provided in the housing of the machine. Motor 31 controls the feed of the sewing machine.

Link 23 is hinged through a bolt 32 to an arm 33 of a swing lever 34 which is mounted on shaft 13. Another, upwardly projecting arm 35 of swing lever 34 is formed with a guide slot 36 at its end, in which a pin 37 is guided. Pin 37 is secured to a supporting arm 38 which is displaceable on a horizontal shaft 39 extending in the housing parallel to the feed direction of the machine. On its free end, supporting arm 38 carries the feed dog 40 by which the work to be sewn by needle 4 in cooperation with a hook is moved. Supporting arm 38 bears by a downwardly projecting extension 41 against cam 18 of lifting eccentric 17.

The housing of the sewing machine further accommodates a microcomputer 42 (FIG. 2) which is connected through lines 43 to a pulse generator 44 driven in synchronism from the main shaft 1 of the sewing machine. Pulse generator 44 delivers a pulse to a microcomputer 42 at every revolution of shaft 1 as soon as needle 4 has cleared the work and stepping motor 12 is ready to change the position of the needle bar; and also as soon as feed dog 40 has terminated its advance step and stepping motor 31 is ready to control the motion through a new feed step. Through lines 45, microcomputer 42 is connected to a unit 46 for controlling the stitching position which, in turn, is connected through lines 47 to stepping motor 12. Similarly, stepping motor 31 is connected to microcomputer 42 through lines 50 and a unit 49 for controlling the feed.

Connected to microcomputer 42 are further a fixed storage (ROM) 52, through lines 51, a working storage (RAM) 54 through lines 53, and a display unit 56 through lines 55. The microcomputer is also connected through lines 57 to selection means 58, through a line 59 to a program entering key 60, through a line 61 to a correction key 62, through a line 63 to a repetition key 64 and through a line 65 to a pattern start key 66.

The two stepping motors 12 and 31 are identical in design and substantially, in control. Stepping motor 12 controls the lateral oscillatory motion of swing arm 5, while stepping motor 31 control the movements of feed dog 40.

The design and function of a microprocessor control is generally known so that a description is omitted. Details of controlling stepping motors through a microprocessor or microcomputer may be learned from German OS No. 29 42 844, for example.

Figure 3:
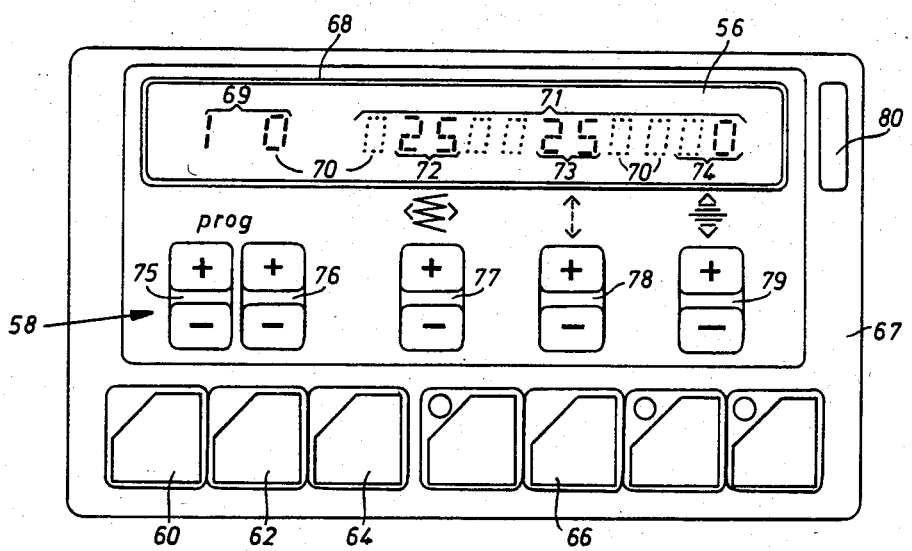
FIGS. 3 to 5 show the control panel on the front side of the sewing machine, with different displays.

On the front side of the sewing machine housing, a control panel 67 (FIGS. 3 to 5) is secured. The panel includes a display window 68 where a display unit 56 is mounted. The display unit comprises a portion 68 with two alphanumeric, 16-segment display elements 70, and a portion 71 with eleven 16-segment alphanumeric display elements 70. In portion 69, the sewing patterns to be recalled are indicated by a two-digit number. If letters or single numerals are to be sewed, they may be indicated directly by the respective letter or numeral.

Portion 71 is subdivided into three sections 72, 73, 74 (FIG. 3) of which section 72 indicates the respective adjusted bight or stitch width in millimeters, section of 73 the feed step in mm, and section 74 the pattern length in millimeters.

Associated with display elements 70 in portion 69 are two rocker-type buttons 75, 76 embodying selection means 58. With the right-hand button 76, the number formed by the two display elements 70 can be indexed up (+) or down (−). With the left-hand button 75, the digit indicated by the left display element 70 can be indexed up (+) or down (−) independently. Rocker-type buttons 77, 78, 79 are also provided below each of the display elements 70 of sections 72, 73, 74. These buttons 77, 78, 79 serve as manual means for indexing up (+) or down (−) the numerals indicated in sections 72, 73, 74.

Below rocker-type buttons 75 to 79, a row of keys is provided for connecting various sewing functions, such as the program entering key 60, the correction key 62, the repetition key 64, and the pattern start key 66.

Display elements 70 of display unit 56 are connected through lines 55 to microcomputer 42 by which a display elements 70 of sections 72, 73, 74 can selectively be activated or all together connected to the program storage formed by a part of working storage 56.

In the fixed storage 52, a plurality of sewing patterns is stored in binary form. The individual sewing patterns may comprise a sequence of any length of single stitches, or only a few stitches, or even only one stitch. The first storage locations of any stored sewing pattern contain a pattern number and several specific pattern data such as the standard width, standard stitch length, standard length of the pattern, maximum length, etc. This is followed by the coordinates of stitch position and feed predetermined for each pattern.

Figure 6:
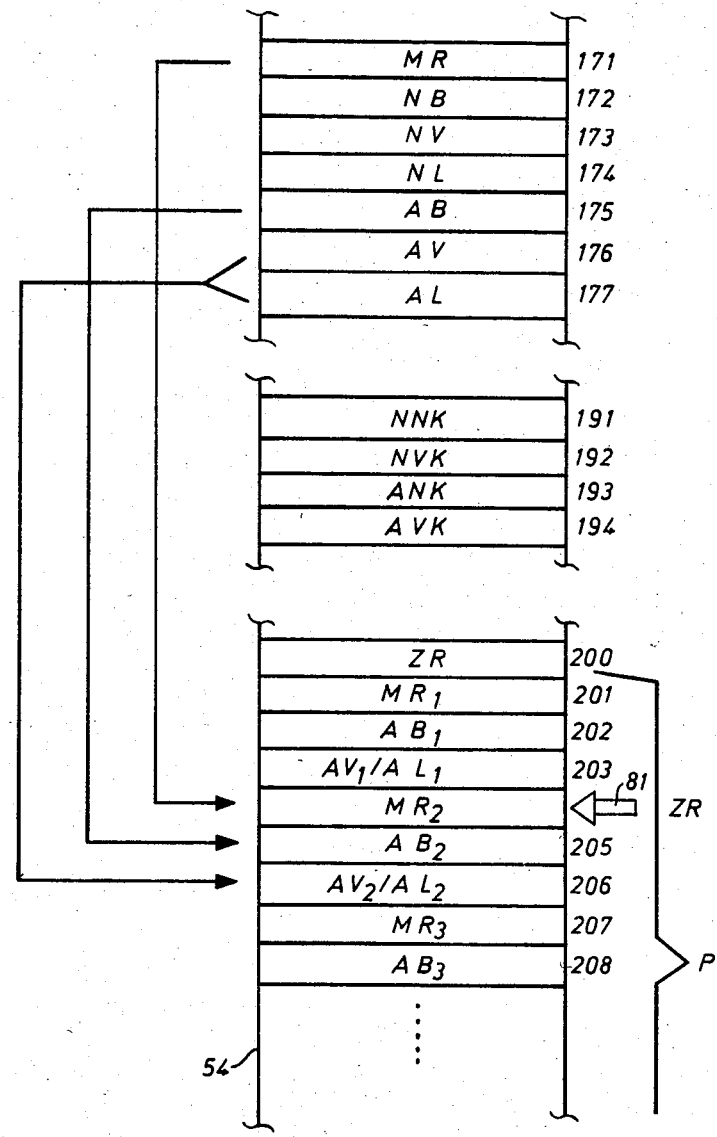
FIG. 6 is a diagram explaining the contents of the working storage.
Figure 7A:
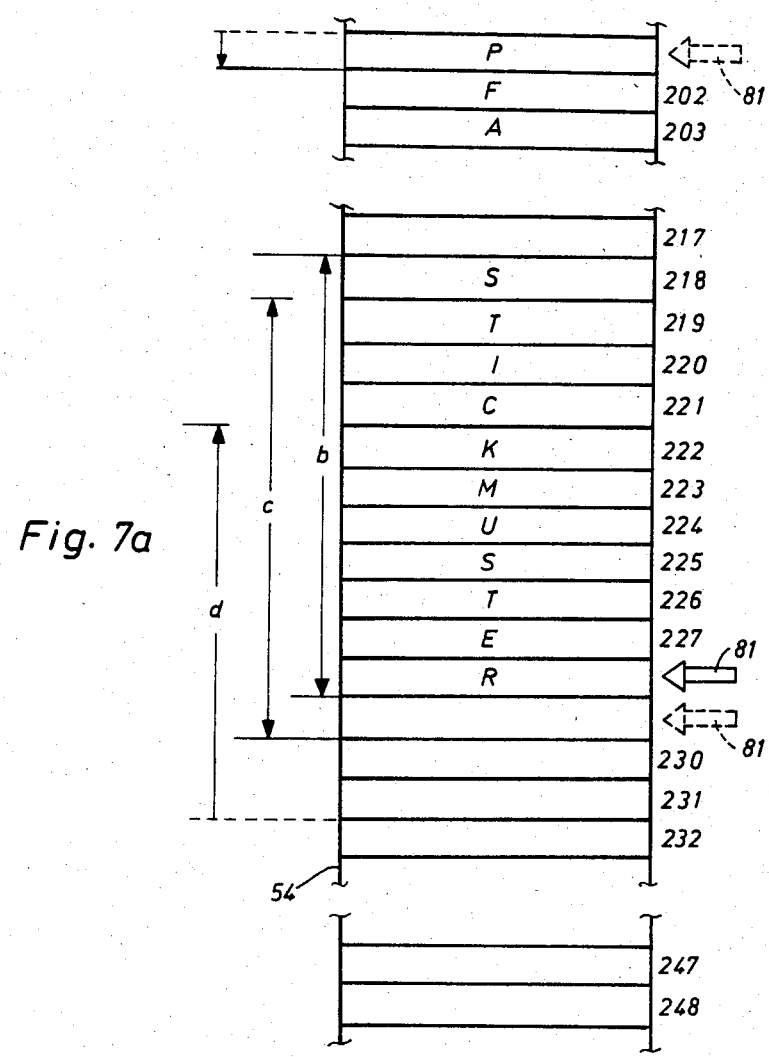
FIGS. 7a, 7b, 7c, 7d are similar diagrams explaining the operation of the working storage and the display.

The program storage P forming a part of working storage 54 includes 48 storage locations, 201 to 248 (FIG. 6). With normal sewing patterns, one storage location is needed for the pattern number NR, one storage location for the stitch position ratio AB, and one for the stitch length AV or pattern length AL so that only 16 sewing patterns can be stored, with these three just mentioned data specifying each pattern, being stored at three consecutive storage locations. If monograms are stored, one storage location is needed for a single character, so that 48 letters, numerals, or symbols can be stored in sequence. To simplify the showing, not the actually stored coded data are indicated in FIG. 7a at the storage location 201, etc. but, instead, the letters themselves.

To limit the size of display unit 56 (FIGS. 3 to 5) and preserve ease in monitoring, portion 71 of the display unit 56 has been limited to 11 display elements 70.

Consequently, the contents of only 11 of the provided 48 storage locations 201 to 248 can be displayed simultaneously. To be able to check the contents of all the locations 201 to 248 of working storage 54, it is provided to slowly shift the coded contents of the indicated storage locations through the display element 70 of portion 71 of the display unit 56. For this purpose, an internal timer of the computer can be connected by means of push button 80, by which a storage pointer 81 (see also FIG. 7) marking the end of the storage section to be instantaneously displayed, is moved every half second to the next higher storage address. If not all of the storage locations 201 to 248 are occupied, storage pointer 81 is moved beyond the last location containing data, up to the last but three of the storage locations, and recommences from the start.

Always 11 storage locations preceding the storage pointer 81 are displayed for reading in display unit 56. Maybe three empty locations will appear between the end and the beginning of the displayed storage region.

Figure 7B:
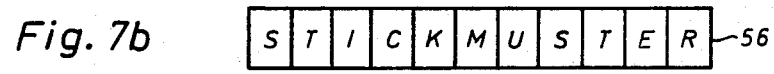

While entering the reference data of a sewing pattern into program storage P, storage point 81 always sets to the last filled storage location. Be it assumed that storage locations 201 to 248 (FIG. 7a) have received a text containing 28 letters, so that the 28 storage locations are occupied. In consequence, as the 28th letter is being stored, storage pointer 81 is set to the last-filled storage locations 228, and the coded contents of the last 11 storage locations 218 to 228 are displayed in display unit 56 (FIG. 7b).

Figure 7C:
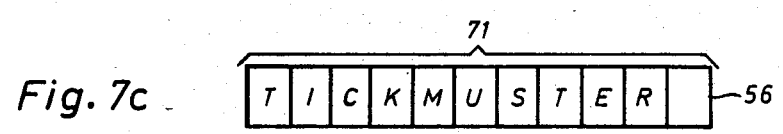
Figure 7D:
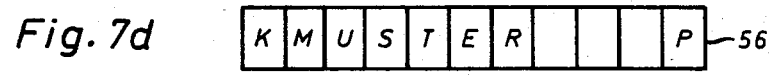

To check the entire contents of the program storage, push button 80 is pressed. This causes shifting of the storage pointer 81 every half second by a storage location to the right, so that after the first step, it points to empty storage location 229. In display unit 56, since the displayed coded contents are being shifted (scrolled) stepwise by one display element 70 to the left, the coded contents of storage locations 219 to 229 are now displayed (FIG. 7c). Storage location 229 is empty, so that the display element 70 just associated with location 229 remains without indication. After the indication of the empty storage locations 229, 230, 231, thus after storage pointer 81 has set to storage location 231, it jumps back to storage location 201. Now, the coded contents of storage locations 222 to 228 are shown in display unit 56 (FIG. 7b), which are followed by the indication of empty location 229 to 231, and by the coded contents of storage location 201. Upon pushing button 18 down once more, microcomputer 42 stops the shifting of the display, and the instantaneous display becomes fixed.

To select a desired sewing pattern, a decadic number associated with the pattern and taken from a table is set up in display element 70 of portion 69 of display unit 56 by means of the two rocker-type buttons 75,76. The sewing patterns may comprise a sequence of any length of individual stitches or only a few stitches or even a single stitch.

Immediately after the setting, the basic data corresponding to the selected sewing pattern are transferred by microcomputer 42 from fixed storage 52 into working storage 54. These basic data are stored at storage location 171 (FIG. 6) and the following ones. Storage location 171 then holds the pattern number MR, storage location 172 the standard width NB associated with the sewing pattern, storage location 173 the standard feed NV associated with the sewing pattern, storage location 174 the standard length NL associated with the sewing pattern, storage location 175 the actual width AB, storage location 176 the actual feed AV, and storage location 177 the actual length LA of the pattern.

While transferring the basic data from fixed storage 52 to working storage 54, the standard values entered into storage locations 172, 173, 174 are initially stored also at storage locations 175, 176, 177. The contents of storage locations 175,176,177 are then recalled by microcomputer 42 through lines 53, recomputed and converted in a manner depending on the sewing pattern into a code to be displayed through display elements 70 in sections 72, 73, 74 of display unit 56. They may be modified by actuating rocker-type buttons 77, 78, 79. The modified values then appear in the respective sections 72, 73, 74 and, at the same time, correspondingly coded by microcomputer 42, are stored at locations 175, 176, 177.

During the sewing operation, the consecutive standard coordinate values of needle position NNK and feed NVK of every following stitch, which are associated with the sewing pattern and stored in fixed storage 52, are read out from fixed storage 52 by microcomputer 52 in a manner controlled by pulse generator 44, and transferred into storage locations 191, 192 of working storage 54. From the respective standard coordinate and the respective standard and actual dimensional values, microcomputer 42 computes the new coordinate to be actually set and stores it at location 191 or 192. There, from values ANK and AVK of the preceding stitch, stored at locations 193, 194 and from values NNK and NVK of the new stitch, stored at locations 191, 192, the microcomputer computes the number and direction of steps to be executed by the respective stepping motor 12 or 13, and controls these motors through stitch position control unit 46 or feed control unit 49, respectively.

Stepping motor 12 moves swing arm 5 to the new stitch position, through crank 10 and link 9. Stepping motor 31, through crank 29, rod 28 and bell crank 25, displaces bolt 24 into misalignment with bolt 32. This, with eccentric 19 in rotation, imparts to swing lever 34 a pivotal motion about shaft 13 which is transmitted through arm 35 and supporting arm 38 as a translational motion to feed dog 40. The usual lifting motion is imparted to feed dog 40 through cam 18 of lifting eccentric 17 and extension 41 of supporting arm 38.

The actual values which, upon the recall of a sewing pattern in portion 69 of display unit 56, are contained in working storage 54 at storage locations 175 and, depending on the sewing pattern at one of storage locations 176, 177, may, after being modified if necessary through rocker-type buttons 77, 78, 79 be transferred by their modified values and with their pattern number through lines 53 into three consecutive empty storage locations 201 to 248 of working storage 54. As already described, upon actuating the program entering key 60, the pattern number MR 1, in coded form, is received at the first empty storage location 201 of working storage 54, the set stitch position at the second storage location 202, and the set stitch length or pattern length at the third storage location 203.

Figure 4:
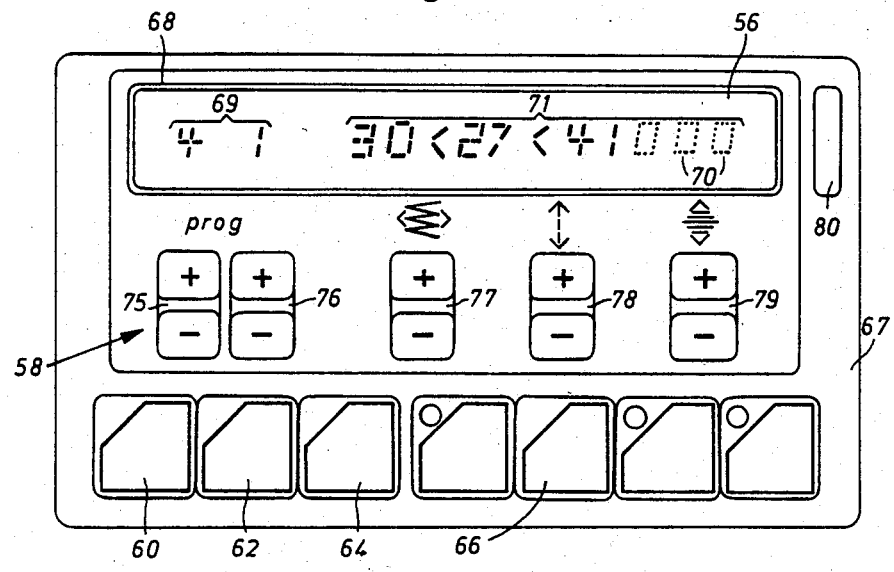

In the same way, further sewing patterns may be recalled from fixed storage 52 and stored through program entering key 60 at storage location 204 to 248. Sewing sequences of individual sewing patterns in any combination may thus be stored. To be sure, what is displayed by the two consecutive display elements 70 of portion 71 is only the pattern number MR, as a decadic number followed by a separation sign < (FIG. 4)

Figure 5:
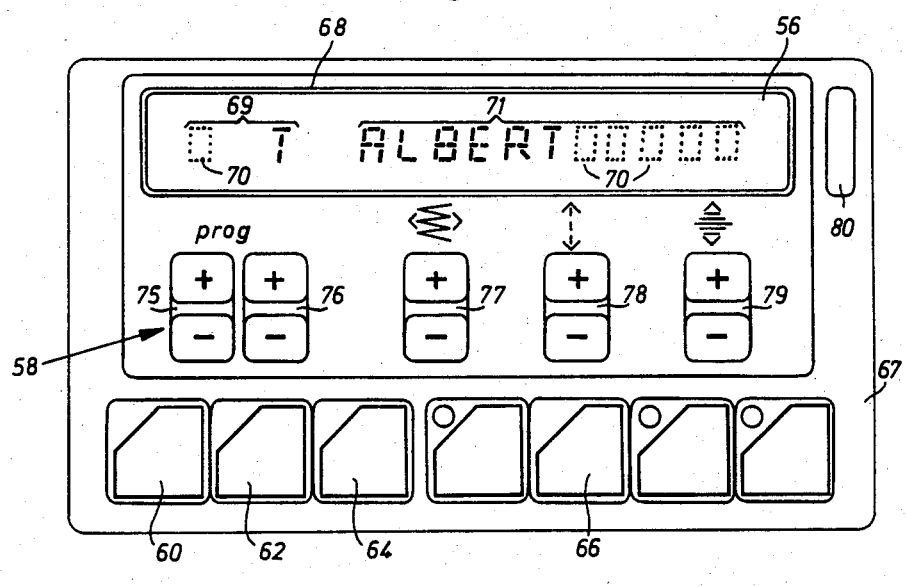

If letters or numerals are entered, no modification of the actual values is provided, so that only the code number of the letter or numeral is stored in the consecutive storage locations 201 to 248 of the program storage portion of the working storage. Even with a not too large program storage portion, longer words may thus be formed (FIG. 5).

An actuation of the repetition key 64 starts the execution of the sewing patterns stored in working storage 54 at storage locations 201 to 248, i.e. during the following operation of the sewing machine, the microcomputer 42 controls the needle bar 4 and the feed dog 40 in a manner such that the patterns are sewed in the sequence in which the pattern numbers are stored in program storage portion P. If sewing patterns are stored, (not letters or numerals), the contents of every three associated consecutive storage locations 201, 202, 203 or 204, 205, 206, etc., (FIG. 6) are transferred into three storage locations 171, 175, and 176 or 177, of working storage 54. If letters or numerals are stored, only the contents of every single storage location 201, 202, 203, or 204, 205, 206, are transferred to storage location 171 of working storage 54. Then, microprocessor 42 recalls the basic data corresponding to the pattern number from fixed storage 52 to store them at the remaining storage locations 172, 173, 174, etc. Now, sequentially, and under the control of pulse generator 44, the coordinates corresponding to pattern number MR are transferred from fixed storage 52 into storage locations 191 and 192 of working storage 54 and used in the above-described manner for positioning the stitches and performing the feed steps of the sewing machine.

With the correction key 62, the storage location 201 to 248 with the last-entered sewing pattern or last-entered letter can be cleared. With the repetition key 64, the machine is switched to the operating mode "sewing of the stored sewing patterns" and simultaneously, the contents of 11 consecutive storage locations 201 to 248 are displayed in portion 71 of display unit 56.

With the pattern start key 66, the pattern just being sewed is reset to the start of the pattern. If the pattern start key 66 is actuated under the operating mode "sewing of the stored sewing patterns", this operating mode is switched off and the sewing pattern earlier indicated in portion 69 of display unit 56 is switched on by microcomputer 42. The actual values of this sewing pattern then appear in the display element 70 of sections 72, 73, 74 of display unit 56.

Through a timer provided in microcomputer 42, display elements 70 are switched on consecutively every 800 microseconds. An internal counter increasing its count at every pulse of the timer and being reset to zero upon reaching the number 10, determines which of the 11 display elements 70 is just to be switched on.

Depending on the count of the counter and the position of a flag, the timer routine jumps to a subroutine for the display element 70 just involved. The flag determines whether to show in portion 71 of the display unit 56 the contents of the corresponding storage location 201 to 248 of working storage 54, or the contents of the corresponding storage location 175, 176, 177 where the sewing parameters of the just selected sewing pattern are stored.

If the flag is set for displaying storage locations 201 to 248, a subroutine is executed in which, in accordance with the position of storage pointer 81, microcomputer 42 through lines 53 recalls from the program storage portion P, the pattern number corresponding to the count, converts the binary code of this pattern number into a display code, and delivers this code through lines 55 serially to the two corresponding serial display elements 70 of display unit 56. Into the third display element 70, microcomputer 42 enters a separation sign to keep the pattern numbers apart.

If the flag for indicating the program storage is not set, a subroutine for displaying the sewing parameters is executed. Through lines 53 and from storage locations 175, 176, 177 of working storage 54, microcomputer 42 recalls the predetermined actual values for the selected sewing pattern, converts the binary value into a display code, and delivers this code serially through lines 55 to the corresponding display elements 70 of sections 72, 73, 74 of display unit 56.

While specific embodiments of the invention have been shown and described in detail to illustrate the application of the principles of the invention, it will be understood that the invention may be embodied otherwise without departing from such principles.

What is claimed is:

1. A sewing machine comprising: an electronic fixed storage containing a plurality of data of sewing patterns, each pattern including stitch position and feed reference data and at least a single individual stitch; means for selecting one at a time of the sewing patterns contained in the fixed storage; manual setting means for varying the stitch position and feed reference data for selected sewing patterns; a microcomputer having a display unit which can be actuated by control means; a program storage; a program entering key for consecutively storing in the program storage the specific reference data of a respective selected single sewing pattern; a device for controlling the sewing machine parts responsible for the stitch formation in accordance with the data stored in the fixed storage and associated with the reference data; said display unit comprising a plurality of alphanumeric display elements arranged in a row, side by side; and means for switching the display unit into a first operating state in which one selected sewing pattern and its associated reference data is indicated by a plurality of predetermined groups of said display elements, and into a second operating state in which a plurality of the selected sewing patterns stored in said program storage are indicated by a plurality of predetermined groups of display elements, in the sequence in which the selected sewing patterns are stored in said program storage.

2. A sewing machine according to claim 1, wherein manual setting means for varying the stitch position and the feed are associated with said predetermined groups of said display element and located in the closed vicinity thereof.

3. A sewing machine according to claim 1, wherein the number of said display elements is smaller than that of the storage locations provided in said working storage of said microcomputer and intended to be set in display, and that the sequence of said display elements is connectable through the microcomputer to a sequential group of storage locations.

4. A sewing machine according to claim 3, wherein said display elements can be switched to the respective next group of storage locations following the just displayed one.

5. A sewing machine according to claim 4, characterized in that relative to the displayed group, the following group of storage locations is displaced by a single storage location.

6. A sewing machine according to claim 4, wherein said display elements are switchable to the sequentially following groups of storage locations in a regularly timed succession.

7. A sewing machine according to claim 1, wherein said program entering key comprises said means for switching the display unit into its first operating state and its second operating state, said program entering key operating to switch said display unit from said first operating state to said second operating state after said means for selecting sewing patterns and said manual setting means have been operated.

8. A sewing machine according to claim 7, wherein said plurality of predetermined groups of display elements includes a first group, said means for selecting comprising at least one switch adjacent and under said first group, a remainder of said predetermined groups positioned in side-by-side relationship next to said first group, said manual setting means comprising a separate switch adjacent to and under each of said remaining groups.

9. A sewing machine according to claim 8, including a further key adjacent said display unit, operable with said display unit in said second operating state to sequentially displace indications of said plurality of selected sewing patterns, to one side of said display unit, and wherein the number of selected sewing patterns is greater than the number of predetermined groups, said further key being operable to indicate additional selected sewing patterns which were not originally displayed at an opposite end of said display unit.

* * * * *